United States Patent
Elgimiabi et al.

(10) Patent No.: US 12,448,551 B2
(45) Date of Patent: Oct. 21, 2025

(54) THERMOSETTABLE PRECURSOR OF A STRUCTURAL ADHESIVE COMPOSITION WITH CORROSION RESISTANCE

(71) Applicant: 3M INNOVATIVE PROPERTIES COMPANY, St. Paul, MN (US)

(72) Inventors: Sohaib Elgimiabi, Düsseldorf (DE); Nurettin Yavuz, Düsseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 962 days.

(21) Appl. No.: 17/311,551

(22) PCT Filed: Dec. 10, 2019

(86) PCT No.: PCT/IB2019/060623
§ 371 (c)(1),
(2) Date: Jun. 7, 2021

(87) PCT Pub. No.: WO2020/128718
PCT Pub. Date: Jun. 25, 2020

(65) Prior Publication Data
US 2021/0380852 A1    Dec. 9, 2021

(30) Foreign Application Priority Data
Dec. 17, 2018 (EP) .................................. 18213017

(51) Int. Cl.
| | | |
|---|---|---|
| *C09J 163/00* | (2006.01) | |
| *C08G 59/40* | (2006.01) | |
| *C08J 9/32* | (2006.01) | |
| *C08K 3/32* | (2006.01) | |
| *C09J 5/06* | (2006.01) | |
| *C09J 5/08* | (2006.01) | |
| *C08G 59/06* | (2006.01) | |
| *C08K 3/013* | (2018.01) | |

(52) U.S. Cl.
CPC ........ *C09J 163/00* (2013.01); *C08G 59/4021* (2013.01); *C08J 9/32* (2013.01); *C08K 3/32* (2013.01); *C09J 5/06* (2013.01); *C09J 5/08* (2013.01); *C08G 59/063* (2013.01); *C08J 2203/22* (2013.01); *C08K 3/013* (2018.01); *C08K 2003/325* (2013.01)

(58) Field of Classification Search
CPC ... C09J 163/00; C09J 5/06; C09J 5/08; C08G 59/4021; C08J 9/32; C08K 3/32
See application file for complete search history.

(56) References Cited

U.S. PATENT DOCUMENTS

| | | |
|---|---|---|
| 6,000,118 A | 12/1999 | Biernat |
| 6,368,008 B1 | 4/2002 | Biernat |
| 6,528,176 B1 | 3/2003 | Asai |
| 9,932,503 B2 | 4/2018 | Harrington |
| 2002/0182955 A1 | 12/2002 | Weglewski |
| 2010/0120936 A1 | 5/2010 | Lamon |
| 2018/0265757 A1 | 9/2018 | Thiede |
| 2018/0282592 A1 | 10/2018 | Cura |

FOREIGN PATENT DOCUMENTS

| | | |
|---|---|---|
| EP | 2700683 | 2/2014 |
| EP | 3170877 | 5/2017 |
| EP | 3 170 877 B1 | 11/2020 |
| JP | 6-306345 A | 11/1994 |
| JP | 3572320 B2 * | 9/2004 |
| WO | WO 2007/025007 A1 | 3/2007 |
| WO | WO 2009-071269 | 6/2009 |
| WO | WO 2012/166257 A1 | 12/2012 |
| WO | WO 2014/031838 A1 | 2/2014 |
| WO | WO 2016/001245 A1 | 1/2016 |
| WO | WO 2017-087295 | 5/2017 |
| WO | WO 2017-197087 | 11/2017 |
| WO | WO 2017/197097 A1 | 11/2017 |

OTHER PUBLICATIONS

Takao JP3572320B2 (translation) (Year: 2004).*
International Search Report for PCT International Application No. PCT/IB2019/060623, mailed on Feb. 11, 2020, 4 pages.

* cited by examiner

*Primary Examiner* — Robert C Boyle
(74) *Attorney, Agent, or Firm* — Carlos M. Téllez Rodríguez; 3M Innovative Properties Co

(57) ABSTRACT

A thermosettable precursor of an expanded structural adhesive composition comprising: an epoxy compound; an epoxy curing agent; an expanding agent; and a mineral pigment selected from the group of phosphate metal complexes. In addition, a method of bonding two parts and to uses of the thermosettable precursor of an expanded structural adhesive composition.

18 Claims, No Drawings

THERMOSETTABLE PRECURSOR OF A STRUCTURAL ADHESIVE COMPOSITION WITH CORROSION RESISTANCE

CROSS REFERENCE TO RELATED APPLICATIONS

This application is a national stage filing under 35 U.S.C. 371 of PCT/IB2019/060623, filed Dec. 10, 2019, which claims the benefit of European Patent Application No. 18213017.9, filed Dec. 17, 2018, the disclosures of which are incorporated by reference in their entirety herein.

TECHNICAL FIELD

The present disclosure relates generally to the field of adhesives, more specifically to the field of structural adhesive compositions for use in particular for bonding metal parts. More specifically, the present disclosure relates to a thermosettable precursor of an expanded structural adhesive composition. The present disclosure also relates to a method of bonding two parts and to a composite article. The present disclosure is further directed to the use of a thermosettable precursor of an expanded structural adhesive composition for construction and automotive applications, in particular for body-in-white bonding applications in the automotive industry.

BACKGROUND

Adhesives have been used for a variety of holding, sealing, protecting, marking and masking purposes. One type of adhesive which is particularly preferred for many applications is represented by structural adhesives. Structural adhesives are typically thermosetting resin compositions that may be used to replace or augment conventional joining techniques such as screws, bolts, nails, staples, rivets and metal fusion processes (e.g. welding, brazing and soldering). Structural adhesives are used in a variety of applications that include general-use industrial applications, as well as high-performance applications in the automotive and aerospace industries. To be suitable as structural adhesives, the adhesives shall exhibit high and durable mechanical strength as well as high impact resistance.

Structural adhesives may, in particular, be used for metal joints in vehicles. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 (Biernat et al.) discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 (Biernat et al.) discloses the use of an adhesive for securing two metal panels together. The edge of the joint is further sealed by a metal coating. WO 2009/071269 (Morral et al.) discloses an expandable epoxy paste adhesive as a sealant for a hem flange. A further hemmed structure is disclosed in U.S. Pat. No. 6,528,176 (Asai et al.). Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. US-A1-2010/0120936 (Lamon), which discloses a thermally expandable and curable epoxy-based precursor of an expanded thermoset foamed film comprising a mixture of solid and liquid epoxy resins, and which is claimed to provide both favorable energy absorbing properties and gap filling properties upon curing. Other partial solutions have been described in EP-A1-2 700 683 (Elgimiabi et al.) and in US-A1-2018/0282592 (Cura et al.) which disclose structural adhesive films suitable for forming a hem flange structure. Further partial solutions have been described in US-A1-2002/0182955 (Weglewski et al.) which discloses a so-called structural bonding tape. Structural bonding tapes are generally insufficient in terms of adhesive strength and corrosion resistance.

Without contesting the technical advantages associated with the solutions known in the art, there is still a need for a structural adhesive composition which would overcome the above-mentioned deficiencies.

SUMMARY

According to one aspect, the present disclosure relates to a thermosettable precursor of an expanded structural adhesive composition. The composition comprises an epoxy compound; an epoxy curing agent; an expanding agent; and a mineral pigment selected from the group of phosphate metal complexes.

In another aspect, the present disclosure is directed to a method of bonding two parts. The method comprises the steps of: providing a first part and a second part; applying a thermosettable precursor as described above to a surface of at least one of the first and/or the second part; adhering the first part and the second part at a temperature lower than the activation temperature of the epoxy curing agent, thereby forming a joint between the first and the second part; and heating the joint formed in the adhering step at a temperature higher than the activation temperature of the epoxy curing agent, thereby obtaining a thermoset structural adhesive composition and bonding the two parts.

According to still another aspect, the present disclosure relates to the use of a thermosettable precursor as described above, for industrial applications, in particular for body-in-white bonding applications for the automotive industry.

DETAILED DESCRIPTION

According to a first aspect, the present disclosure relates to a thermosettable precursor of an expanded structural adhesive composition comprising: an epoxy compound; an epoxy curing agent; an expanding agent; and a mineral pigment selected from the group of phosphate metal complexes.

In the context of the present disclosure, it has been surprisingly found that a thermosettable precursor of an expanded structural adhesive composition as described above is particularly suitable for manufacturing expanded structural adhesive compositions provided with excellent characteristics and performance as to expansion rate and gap filling properties; as well as to adhesive strength, in particular overlap shear strength; corrosion resistance, in particular under humid conditions; and ageing stability, in particular when subjected to ageing conditions such as the so-called (humid) cataplasma conditions.

This is a particularly surprising finding as it has been further discovered—in the context of the present disclosure—that the common expanding agents used for the manufacture of expanded structural adhesive compositions, such as e.g. non-encapsulated blowing agents, encapsulated blowing agents (in particular, expandable microspheres filled with liquefied gas and encapsulated in a polymeric thermoplastic shell) or non-spherical inorganic expanded particles, are particularly sensitive to water-induced corrosion due to the presence of highly corrosion-sensitive chemicals. The Applicant was therefore faced with the technical challenge of formulating a thermosettable precursor of an expanded structural adhesive composition using commonly available expanding agents whilst ensuring excellent corrosion resistance.

In the context of the present disclosure, it has been no less surprisingly found that a thermosettable precursor of an expanded structural adhesive composition as described above is particularly suitable for manufacturing expanded structural adhesive compositions which, when used for bonding two metal parts, have an outstanding ability to prevent, or at least to substantially reduce, the formation of corrosion at the metal bonding interface.

It has further been discovered that the thermosettable precursor as described above is suitable for manufacturing expanded structural adhesive compositions provided with excellent characteristics and performance as to adhesion to oily contaminated substrates, such as stainless steel and aluminum.

Without wishing to be bound by theory, it is believed that these outstanding properties and characteristics are due in particular to the presence of the mineral pigment specifically selected from the group of phosphate metal complexes and which have an outstanding ability to provide the thermosettable precursors and the resulting expanded structural adhesive compositions as described above with excellent characteristics and performance as to ageing stability and corrosion resistance, in particular under humid conditions. Still without wishing to be bound by theory, it is believed that the phosphate metal complexes act as powerful scavengers for those metal ions (in particular ferrous Fe(II) and ferric Fe(III) cations) involved in metal corrosion chemical mechanisms.

As such, the thermosettable precursor of the present disclosure is outstandingly suitable for bonding metal parts, in particular for body-in-white bonding applications, more in particular for hem flange bonding of metal parts in the automotive industry. In some advantageous aspects still, the thermosettable precursor is suitable for automated handling and application, in particular by fast robotic equipment.

The terms "glass transition temperature" and "Tg" are used interchangeably and refer to the glass transition temperature of a (co)polymeric material or a mixture of monomers and polymers. Unless otherwise indicated, glass transition temperature values are determined by Differential Scanning calorimetry (DSC).

The thermosettable precursor of an expanded structural adhesive composition according to the disclosure comprises an epoxy compound. Epoxy compounds for use herein are not particularly limited. Any epoxy compounds commonly known in the art of structural adhesives may be used in the context of the present disclosure. Suitable epoxy compounds for use herein may be easily identified by those skilled in the art, in the light of the present disclosure.

Epoxy compounds, also commonly referred to as epoxy resins, are well known to those skilled in the art of structural adhesive compositions. Suitable epoxy resins for use herein and their methods of manufacturing are amply described e.g. in EP-A1-2 700 683 (Elgimiabi et al.) and in US-A1-2018/0282592 (Cura et al.), the full content of which is herewith incorporated by reference.

According to one exemplary aspect, the epoxy compound for use herein is an epoxy resin selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

In one advantageous aspect of the disclosure, the epoxy compound for use herein is an epoxy resin selected from the group consisting of novolac epoxy resins, bisphenol epoxy resins, in particular those derived from the reaction of bisphenol-A with epichlorhydrin (DGEBA resins), and any mixtures thereof.

According to a particularly advantageous aspect of the disclosure, the epoxy compound for use herein has an average epoxy equivalent weight of less than 250 g/equivalent, less than 230 g/equivalent, less than 220 g/equivalent, or even less than 200 g/equivalent. Advantageously still, the epoxy compound for use herein has a weight average molecular weight of less than 700 g/mol, less than 500 g/mol, or even less than 400 g/mol.

In a preferred execution of the disclosure, the thermosettable precursor of an expanded structural adhesive composition according to the disclosure further comprises a second epoxy resin preferably selected from the group consisting of hydrogenated bisphenol epoxy resins, in particular those derived from the reaction of hydrogenated bisphenol-A with epichlorhydrin (hydrogenated DGEBA resins), and any mixtures thereof. In the context of the present disclosure, it has been indeed surprisingly discovered that the use of a second epoxy resin selected in particular from the group of hydrogenated bisphenol epoxy resins, substantially maintains or even improve the adhesion properties, in particular the peel adhesion properties of the resulting structural adhesive composition towards oily contaminated substrates. These specific thermosettable precursors are particularly suitable to result into structural adhesive compositions having outstanding excellent oil-contamination tolerance towards, in particular oily contaminated metal substrates. Exemplary oily contamination is for example mineral oils, and synthetic oils. Typical mineral oils include paraffinic mineral oils, intermediate mineral oils and naphthenic mineral oils. The thermosettable precursor of an expanded structural adhesive composition which further comprises a second epoxy resin preferably selected from the group consisting of hydrogenated bisphenol epoxy resins have also been found to result into structural adhesive compositions provided with advantageous mechanical properties, in particular advantageous material softness.

In a typical aspect, the thermosettable precursor of an expanded structural adhesive composition according to the disclosure comprises from 20 to 60 wt. %, from 30 to 60 wt. %, from 30 to 50 wt. %, or even from 35 to 45 wt. % of the epoxy compound, based on the total weight of the thermosettable precursor composition.

The thermosettable precursor of an expanded structural adhesive composition according to the disclosure further comprises an epoxy curing agent. Epoxy curing agents for use herein are not particularly limited. Any epoxy curing agents commonly known in the art of structural adhesives may be used in the context of the present disclosure. Suitable epoxy curing agents for use herein may be easily identified by those skilled in the art, in the light of the present disclosure.

According to one typical aspect of the disclosure, the epoxy curing agent for use herein is selected from the group consisting of rapid-reacting epoxy curing agents, latent epoxy curing agents, and any combinations or mixtures thereof. More typically, the epoxy curing agent for use herein is selected from the group consisting of rapid-reacting thermally-initiated epoxy curing agents, latent thermally-initiated epoxy curing agents, and any combinations or mixtures thereof.

According to an advantageous aspect of the present disclosure, the epoxy curing agent is selected from the group consisting of primary amines, secondary amines, and any combinations or mixtures thereof.

According to another advantageous aspect, the amines for use as c epoxy curing agent are selected from the group consisting of aliphatic amines, cycloaliphatic amines, aromatic amines, aromatic structures having one or more amino moiety, polyamines, polyamine adducts, dicyandiamides, and any combinations or mixtures thereof.

According to still another advantageous aspect of the disclosure, the epoxy curing agent for use herein is selected from the group consisting of dicyandiamide, polyamines, polyamine adducts, and any combinations or mixtures thereof. In a preferred aspect, the epoxy curing agent is selected to be dicyandiamide.

In a typical aspect, the thermosettable precursor of an expanded structural adhesive composition according to the disclosure comprises from 0.1 to 20 wt. %, from 0.2 to 15 wt. %, from 0.2 to 10 wt. %, from 0.5 to 8 wt. %, from 1 to 6 wt. %, or even from 1 to 4 wt. % of the epoxy curing agent, based on the total weight of the thermosettable precursor composition.

In an advantageous execution, the thermosettable precursor of an expanded structural adhesive composition according to the disclosure may further comprise a curing accelerator, which is in particular selected from the group consisting of polyamines, polyamine adducts, ureas, substituted urea adducts, imidazoles, imidazole salts, imidazolines, aromatic tertiary amines, and any combinations or mixtures thereof.

Curing accelerators for use herein are not particularly limited. Any curing accelerators commonly known in the art of structural adhesives may be used in the context of the present disclosure. Suitable epoxy curing accelerators for use herein may be easily identified by those skilled in the art, in the light of the present disclosure.

Epoxy curing agents and curing accelerators are well known to those skilled in the art of structural adhesive compositions. Suitable epoxy curing agents and curing accelerators for use herein and their methods of manufacturing are amply described e.g. in EP-A1-2 700 683 (El-gimiabi et al.) in US-A1-2018/0282592 (Cura et al.), the full content of which is herewith incorporated by reference.

In one preferred execution, the curing accelerator for use herein is selected from the group of polyamine adducts, substituted ureas, in particular N-substituted urea adducts.

In a particularly preferred execution of the disclosure, the curing accelerator is selected from the group of substituted urea adducts, in particular N-substituted (bis)urea adducts.

In a typical aspect, the thermosettable precursor of an expanded structural adhesive composition according to the disclosure comprises from 0.05 to 10 wt. %, from 0.1 to 10 wt. %, from 0.2 to 8 wt. %, from 0.2 to 6 wt. %, from 0.2 to 5 wt. %, from 0.5 to 5 wt. %, or even from 0.5 to 4 wt. % of the curing accelerator of the epoxy compound, based on the total weight of the thermosettable precursor composition.

The thermosettable precursor of an expanded structural adhesive composition according to the disclosure further comprises an expanding agent. Expanding agents for use herein are not particularly limited. Any expanding agents commonly known in the art of structural adhesives may be used in the context of the present disclosure. Suitable expanding agents for use herein may be easily identified by those skilled in the art, in the light of the present disclosure.

According to one typical aspect of the disclosure, the expanding agent for use herein is selected from the group consisting of (thermally) expandable agents and (thermally) expanded agents, and any combinations or mixtures thereof.

In an advantageous aspect, the (thermally) expandable agent for use is selected from the group consisting of non-encapsulated blowing agents, in particular chemical blowing agents, encapsulated blowing agents, and any combinations or mixtures thereof.

In one particularly advantageous aspect of the disclosure, the encapsulated blowing agent for use herein is selected from the group consisting of expandable microspheres, in particular expandable microspheres filled with liquefied gas and in particular encapsulated in a polymeric thermoplastic shell.

In an exemplary aspect, the liquefied gas encapsulated into the expandable microspheres is selected from the group consisting of trichlorofluoromethane, and hydrocarbons, in particular n-pentane, iso-pentane, neo-pentane, butane, and iso-butane, and any combinations or mixtures thereof.

Encapsulated blowing agents for use in the thermosettable precursor of an expanded structural adhesive composition are commercially available from e.g. Pierce & Stevens Chemical Corp under the trade designation Micropearl™, from Matsumoto under the trade name Microsphere™ or from Akzo Nobel under the trade name Expancel™.

In another particularly advantageous aspect of the disclosure, the non-encapsulated blowing agent for use herein is selected from the group consisting of azobisisobutyronitriles, azodicarbonamides, carbazides, hydrazides, non-azo chemical blowing agents based on sodium borohydride or sodium bicarbonate/citric acid and dinitrosopentamethylenetetramine, and any combinations or mixtures thereof. Non-encapsulated blowing agents for use herein, and which are sometimes also referred to as chemical blowing agents, have the ability to release a gaseous compound such as e.g. nitrogen, nitrogen oxide, hydrogen or carbon dioxide during heating.

In still another particularly advantageous aspect of the disclosure, the (thermally) expanded agent is selected from the group consisting of non-spherical inorganic expanded particles, in particular inorganic expanded particles having an irregular shape or a flake shape.

In one very advantageous aspect of the disclosure, the (thermally) expanded agents comprise expanded perlite particles.

Perlite is a naturally occurring hydrated volcanic glass formed by the alteration of obsidian. Typically, perlite is composed of silicon dioxide (from 70 to 75 wt. %), aluminum oxide (from 12 to 17 wt. %), sodium oxide (from 3 to 4 wt. %), potassium oxide (from 3 to 5 wt. %), iron oxide (from 0.5 to 2 wt. %), magnesium oxide (from 0.2 to 0.7 wt. %) and calcium oxide (from 0.5 to 1.5 wt. %). Natural perlite further contains from 3 to 5 wt. % water. The perlite for use in the present disclosure is expanded to obtain very low-density bubbles in the precursor material and therefore provide an expanded structural adhesive composition. Those bubbles are obtained due the presence of water in the crude perlite rock. Upon accelerated heating to above 870° C., the crude perlite rock pops in a manner similar to popcorn as the glass ore particles soften in the flame and the water in the ore turns to steam and expends forming the numerous low-density bubbles previously mentioned. This process for expanding perlite is known.

Expanded perlite for use in the present disclosure is in particulate form, whereas the expanded perlite particles have in particular an average diameter from 1 to 300 micrometers, in particular from 10 to 150 micrometers. Expanded perlite particles of that size are available on the market and can be produced by crushing the expanded perlite obtained by the heat treatment of perlite rock as set out above.

According to an advantageous aspect, the expanded perlite particles for use herein are provided with a surface modification, which is advantageously chosen from hydrophobic surface modifications, like a silane surface modification and hydrophilic surface modifications like an epoxydation, amination or an acrylate functionalization.

According to one very preferred execution, the expanding agent for use in the thermosettable precursor of the disclosure, is selected from the group consisting of expandable microspheres, expanded perlite particles, and any combinations or mixtures thereof.

In a typical aspect, the thermosettable precursor of an expanded structural adhesive composition according to the disclosure comprises from 0.05 to 10 wt. %, from 0.1 to 10 wt. %, from 0.2 to 8 wt. %, from 0.2 to 6 wt. %, from 0.5 to 6 wt. %, or even from 0.5 to 5 wt. % of the expanding agent, based on the total weight of the thermosettable precursor composition.

In another typical aspect, the amount of the expanding agent in the thermosettable precursor of an expanded structural adhesive composition is selected such as to provide the expanded structural adhesive with a free expansion rate upon curing in a range from 30 to 150%, from 40 to 120%, from 50 to 100%, from 60 to 100%, or even from 70 to 100%, when the free expansion rate is measured as described in the Test Methods section according to AECMA Standard EN 2667-3.

The thermosettable precursor of an expanded structural adhesive composition according to the disclosure further comprises a mineral pigment selected from the group of phosphate metal complexes. Mineral pigments for use herein are not particularly limited as long as they are selected from the group of phosphate metal complexes. Suitable mineral pigments for use herein may be easily identified by those skilled in the art, in the light of the present disclosure.

According to one advantageous aspect, the phosphate metal complex for use herein is selected from the group consisting of orthophosphate metal complexes, polyphosphate metal complexes, and any combinations or mixtures thereof.

According to a more advantageous aspect, the metal of the phosphate metal complex for use herein is selected from the group consisting of aluminum, molybdenum, zinc, alkaline-earth metals, and any combinations or mixtures. More advantageously, the metal of the phosphate metal complex for use herein is selected from the group consisting of alkaline-earth metals, in particular form the group consisting of calcium, magnesium, strontium, barium, and any combinations or mixtures.

In another advantageous aspect of the present disclosure, the phosphate metal complex is selected from the group consisting of (tertiary) metal aluminum orthophosphates, (tertiary) metal aluminum polyphosphates, (tertiary) metal magnesium orthophosphates, (tertiary) metal magnesium polyphosphates, and any combinations or mixtures thereof.

In still another beneficial aspect, the phosphate metal complex for use herein is selected from the group consisting of (tertiary) alkaline-earth aluminum orthophosphates, (tertiary) alkaline-earth aluminum polyphosphates, (tertiary) alkaline-earth hydrogen orthophosphates, (tertiary) alkaline-earth hydrogen polyphosphates, and any combinations or mixtures thereof.

In yet another beneficial aspect, the phosphate metal complex for use herein is selected from the group consisting of zinc (ortho)phosphate, zinc aluminum orthophosphate, zinc aluminum polyphosphate, zinc molybdenum (ortho)phosphate, calcium magnesium orthophosphate, strontium aluminum polyphosphate, and any combinations or mixtures thereof.

According to an even more advantageous aspect, the phosphate metal complex is zinc-free.

According to a particularly preferred aspect of the present disclosure, the phosphate metal complex for use in the thermosettable precursor of an expanded structural adhesive composition is selected from the group consisting of calcium magnesium orthophosphate, strontium aluminum polyphosphate, and any combinations or mixtures thereof.

Suitable mineral pigments selected from the group of phosphate metal complexes for use herein are commercially available from e.g. Heubach GmbH under the trade designation Heucophos®. Exemplary mineral pigments commercially available from Heubach GmbH and suitable for use herein include, but are not limited to, Heucophos® ZPA, Heucophos® ZPO, Heucophos® ZMP, Heucophos® CMP, Heucophos® ACP, Heucophos® ZAPP, Heucophos® SAPP, Heucophos® SRPP, Heucophos® CAPP, Heucophos® ZAM, and Heucophos® ZCP. Advantageous mineral pigments commercially available from Heubach GmbH and suitable for use herein include Heucophos® CMP and Heucophos® SAPP.

In an advantageous aspect, the thermosettable precursor of an expanded structural adhesive composition according to the disclosure comprises no greater than 50 wt. %, no greater than 40 wt. %, no greater than 30 wt. %, no greater than 20 wt. %, no greater than 15 wt. %, no greater than 12 wt. %, or even no greater than 10 wt. % of the mineral pigment selected from the group of phosphate metal complexes, based on the total weight of the thermosettable precursor composition.

In another advantageous aspect, the thermosettable precursor of an expanded structural adhesive composition according to the disclosure comprises at least 0.25 wt. %, at least 0.5 wt. %, at least 1.0 wt. %, at least 1.5 wt. %, at least 2.0 wt. %, at least 2.5 wt. %, or even at least 3.0 wt. % of the mineral pigment selected from the group of phosphate metal complexes, based on the total weight of the thermosettable precursor composition.

In still another advantageous aspect, the thermosettable precursor of an expanded structural adhesive composition according to the disclosure comprises from 0.5 to 50 wt. %, from 1 to 40 wt. %, from 2 to 30 wt. %, from 2 to 25 wt. %, from 3 to 20 wt. %, from 3 to 15 wt. % or even from 5 to 10 wt. % of the mineral pigment selected from the group of phosphate metal complexes, based on the total weight of the thermosettable precursor composition.

The thermosettable precursor of an expanded structural adhesive composition according to the disclosure may further comprise an optional mineral filler capable of absorbing water. Mineral fillers for use herein are not particularly limited as long as they are capable of absorbing water. Suitable mineral fillers for use herein may be easily identified by those skilled in the art, in the light of the present disclosure.

In a typical aspect of the disclosure, the mineral filler capable of absorbing water is capable of chemically reacting with water, thereby effectively scavenging the water which may otherwise penetrate and come into contact with either the (non-thermoset) precursor of the expanded structural adhesive composition or the resulting thermoset structural adhesive. The presence of water may detrimentally affect not only the adhesive bonding performance of the structural adhesive composition, but also its structural integrity along with other properties.

The mineral filler capable of absorbing water for use herein may advantageously provide the expanded structural adhesive with further reinforcement and additional structural strength.

According to one advantageous aspect, the mineral filler is selected from the group consisting of metal oxides and metal hydroxides, in particular from the group consisting of MgO, CaO, BaO, $K_2O$, $Li_2O$, $Na_2O$, SrO, and any mixtures thereof.

According to a more advantageous aspect, the mineral filler capable of absorbing water for use herein is selected from the group consisting of CaO, MgO, and any mixtures thereof. In a particularly advantageous aspect of the present disclosure, the mineral filler for use herein is selected to comprise CaO.

In a typical aspect, the thermosettable precursor of an expanded structural adhesive composition according to the disclosure comprises from 0.1 to 35 wt. %, from 0.5 to 30 wt. %, from 1 to 25 wt. %, from 1 to 20 wt. %, or even from 2 to 15 wt. % of the mineral filler capable of absorbing water, based on the total weight of the thermosettable precursor composition.

The thermosettable precursor of an expanded structural adhesive composition according to the disclosure may further comprise an optional secondary filler material which is different from the mineral filler capable of absorbing water. Secondary filler materials for use herein are not particularly limited as long as they are different from the mineral filler capable of absorbing water. Suitable secondary filler materials for use herein may be easily identified by those skilled in the art, in the light of the present disclosure.

According to an exemplary aspect, the secondary filler material for use herein is selected from the group consisting of carbon black, graphite, mineral carbon source, glass beads, glass chips, metal chips, metal flakes, glass bubbles, silicon oxide SiO2, metal silicates, carbonates, silicates, hydrated silicates (talc), borates, oxides, hydroxides, sulfates, titanates, zirconates and any combinations or mixtures thereof.

According to one advantageous aspect, the secondary filler material for use herein is selected form the group consisting of silicon oxide SiO2, metal silicates, carbonates, silicates, hydrated silicates (talc), borates, oxides, hydroxides, sulfates, titanates, zirconates and any combinations or mixtures thereof.

In a particularly advantageous aspect, the secondary filler material for use herein is a silicon oxide $SiO_2$ selected from the group consisting of fumed silica, fused silica, silica gel, quartz, and any combinations or mixtures thereof.

In a more particularly advantageous aspect, the secondary filler material for use herein is a silicon oxide SiO2 selected from the group consisting of fumed silica and fused silica, in particular the secondary filler material is fused silica. Suitable fused silica for use herein is commercially available from e.g. Minco Inc. under the trade designation Minsil 20. Suitable fumed silica, in particular hydrophobic fumed silica, for use herein is commercially available from e.g. Evonik under the trade designation Aerosil™ or from Cabot under trade designation Cab-O-Sil™.

According to one beneficial aspect, the secondary filler material for use herein is used in the form of a blend of one or more filler material, in particular a blend of one or more secondary filler material and one or more mineral filler capable of absorbing water.

According to a particular aspect of the present disclosure, the thermosettable precursor of an expanded structural adhesive composition further comprises a blend comprising MgO, CaO, BaO, $K_2O$, $Li_2O$, $Na_2O$ and $SiO_2$, in particular a blend comprising MgO, CaO and $SiO_2$, metal silicates, carbonates, silicates, hydrated silicates (talc), borates, oxides, hydroxides, sulfates titanates, zirconates.

In a particularly preferred aspect, the thermosettable precursor of the present disclosure comprises a blend comprising CaO and $SiO_2$. In another particularly preferred aspect, the thermosettable precursor of the present disclosure comprises a blend consisting of CaO and SiO2.

In a typical aspect, the thermosettable precursor of an expanded structural adhesive composition according to the disclosure comprises from 0.5 to 50 wt. %, from 1 to 45 wt. %, from 2 to 40 wt. %, from 3 to 30 wt. %, or even from 5 to 25 wt. % of the secondary filler material, based on the total weight of the thermosettable precursor composition.

According to an advantageous aspect, the thermosettable precursor of an expanded structural adhesive composition according to the disclosure may further comprise an optional thermoplastic resin. Thermoplastic resins for use herein are not particularly limited. Any thermoplastic resins commonly known in the art of structural adhesives may be used in the context of the present disclosure. Suitable thermoplastic resins for use herein may be easily identified by those skilled in the art in the light of the present disclosure.

Thermoplastic resins are known to those skilled in the art of structural adhesive compositions. Suitable exemplary thermoplastic resins for use herein are described e.g. in EP-A1-2 700 683 (Elgimiabi et al.).

According to one advantageous aspect of the disclosure, the thermoplastic resins for use herein have a glass transition temperature (Tg) in a range from 60° C. and 140° C., when measured by Differential Scanning calorimetry (DSC).

In a more advantageous aspect, the thermoplastic resins for use herein have a softening point comprised between 70° C. and 120° C., preferably between 80° C. and 100° C., more preferably between 85° C. and 95° C.

According to another advantageous aspect of the disclosure, the thermoplastic resin for use herein is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

According to still another advantageous aspect of the disclosure, the thermoplastic resin for use herein is selected from the group of polyether thermoplastic resins, and in particular polyhydroxyether thermoplastic resins.

In a more advantageous aspect, the polyhydroxyether thermoplastic resins for use herein are selected from the group consisting of phenoxy resins, polyether diamine resins, polyvinylacetal resins, in particular polyvinyl butyral resins, and any combinations or mixtures thereof.

According to a particularly preferred execution of the disclosure, the thermoplastic resin for use herein is selected from the group of phenoxy resins.

Suitable thermoplastic resins for use herein are commercially available from InChem Corporation under trade designation PKHP, PKHH, PKHA, PKHB, PKHC, PKFE, PKHJ, PKHM-30 or PKHM-301, PKCP, PKH-200.

In the context of the present disclosure, it has been indeed surprisingly discovered that the use of a thermoplastic resin, in particular a thermoplastic resin selected from the group of phenoxy resins, substantially improve the adhesion properties, in particular the peel adhesion properties, as well as the toughening characteristics of the resulting structural adhesive composition. This is particularly surprising and counterintuitive as thermoplastic resins are generally recognized and used as film-forming additives.

In a typical aspect, the thermosettable precursor of an expanded structural adhesive composition according to the disclosure comprises from 1 to 50 wt. %, from 2 to 40 wt. %, from 3 to 35 wt. %, from 4 to 30 wt. %, from 4 to 25 wt. %, or even from 5 to 20 wt. % of the thermoplastic resin, based on the total weight of the thermosettable precursor composition.

According to one advantageous aspect of the thermosettable precursor of an expanded structural adhesive composition, the weight ratio of the epoxy compound and the thermoplastic resin is in a range from 0.5 to 4, from 1 to 3, from 1.5 to 2.5, or even from 1.8 to 2.2.

According to another advantageous aspect, the thermosettable precursor of an expanded structural adhesive composition according to the disclosure may further comprise an optional toughening agent. Toughening agents for use herein are not particularly limited. Any toughening agents commonly known in the art of structural adhesives may be used in the context of the present disclosure. Suitable toughening agents for use herein may be easily identified by those skilled in the art in the light of the present disclosure.

Toughening agents are known to those skilled in the art of structural adhesive compositions. Suitable exemplary toughening agents for use herein are described e.g. in EP-A1-2 700 683 (Elgimiabi et al.).

According to one advantageous aspect of the disclosure, the toughening agent for use herein is selected from the group comprising consisting of core-shell toughening agents, CTBNs (carboxyl and/or nitrile terminated butadiene/nitrile rubbers), high molecular weight amine terminated polytetramethylene oxide, and any combinations or mixtures thereof. In a more advantageous aspect, the toughening agent for use herein is selected from the group consisting of core-shell toughening agents.

Core-shell toughening agents which are useful in the thermosettable precursor composition are commercially available, for example, from DOW under the trade designation Paraloid™, or Kane Ace™ MX153 from Kaneka, or Clearstrength™ products from Arkema Alternative core shell material are acrylic impact modifiers from Arkema, with products from the trade name Durastrength. CTBN toughening agents which are useful in the present disclosure are commercially available, for example, from Hanse Chemie AG, Hamburg, Germany, under the trade designation Albipox™. An exemplary high molecular weight amine terminated polytetramethylene oxide useful in the thermosettable precursor composition is commercially available, for example, from 3M Company, St. Paul/MN, USA, under the trade designation "3M EPX™ Rubber".

In a typical aspect, the thermosettable precursor of an expanded structural adhesive composition according to the disclosure comprises from 5 to 60 wt. %, from 5 to 55 wt. %, from 10 to 50 wt. %, from 10 to 40 wt. %, or even from 15 to 40 wt. % of the toughening agent, based on the total weight of the thermosettable precursor composition.

According to one advantageous aspect of the thermosettable precursor of an expanded structural adhesive composition, the weight ratio of the toughening agent and the thermoplastic resin is in a range from 1 to 4, from 1 to 3, from 1.5 to 2.5, or even from 1.8 to 2.2.

According to an advantageous aspect of the present disclosure, the thermosettable precursor of an expanded structural adhesive composition comprises:

a) from 20 to 60 wt. %, from 30 to 60 wt. %, from 30 to 50 wt. %, or even from 35 to 45 wt. % of the epoxy compound;

b) from 0.1 to 20 wt. %, from 0.2 to 15 wt. %, from 0.2 to 10 wt. %, from 0.5 to 8 wt. %, from 1 to 6 wt. %, or even from 1 to 4 wt. % of the epoxy curing agent;

c) from 0.05 to 10 wt. %, from 0.1 to 10 wt. %, from 0.2 to 8 wt. %, from 0.2 to 6 wt. %, from 0.5 to 6 wt. %, or even from 0.5 to 5 wt. % of the expanding agent;

d) from 0.5 to 50 wt. %, from 1 to 40 wt. %, from 2 to 30 wt. %, from 2 to 25 wt. %, from 3 to 20 wt. %, from 3 to 15 wt. % or even from 5 to 10 wt. % of the mineral pigment selected from the group of phosphate metal complexes;

e) optionally, from 0.1 to 35 wt. %, from 0.5 to 30 wt. %, from 1 to 25 wt. %, from 1 to 20 wt. %, or even from 2 to 15 wt. % of the mineral filler capable of absorbing water;

f) optionally, from 0.5 to 50 wt. %, from 1 to 45 wt. %, from 2 to 40 wt. %, from 3 to 30 wt. %, or even from 5 to 25 wt. % of the secondary filler material;

g) optionally, from 1 to 50 wt. %, from 2 to 40 wt. %, from 3 to 35 wt. %, from 4 to 30 wt. %, from 4 to 25 wt. %, or even from 5 to 20 wt. % of the thermoplastic resin;

h) optionally, from 0.05 to 10 wt. %, from 0.1 to 10 wt. %, from 0.2 to 8 wt. %, from 0.2 to 6 wt. %, from 0.2 to 5 wt. %, from 0.5 to 5 wt. %, or even from 0.5 to 4 wt. % of the curing accelerator of the epoxy compound; and i) optionally, from 5 to 60 wt. %, from 5 to 55 wt. %, from 10 to 50 wt. %, from 10 to 40 wt. %, or even from 15 to 40 wt. % of the toughening agent;

based on the total weight of the thermosettable precursor composition.

In an advantageous aspect of the present disclosure, the thermosettable precursor composition is (substantially) free of solvents, in particular (substantially) free of polar solvents, more in particular (substantially) free of organic solvents or water. By "substantially free of solvents", it is herewith meant to express that the thermosettable precursor of an expanded structural adhesive composition comprises less than 10 wt. %, less than 5 wt. %, less than 2 wt. %, less than 1 wt. %, or even less than 0.5 wt. % of solvents, based on the total weight of the thermosettable precursor composition.

According to an advantageous aspect of the disclosure, the thermosettable precursor of an expanded structural adhesive composition provides an overlap shear strength of at least 10 MPa, at least 12 MPa, at least 14 MPa, or even at least 16 MPa, when measured at 23° C. as described in the Test Methods section according to DIN EN 1465 on aluminum substrate at least partially covered with oil.

According to still another advantageous aspect of the disclosure, the thermosettable precursor of an expanded structural adhesive composition provides a drop of overlap shear strength of no greater than 30% or less, no greater than 25%, no greater than 20%, no greater than 15%, no greater than 10%, or even no greater than 5%, when measured at 23° C. after cataplasma conditions as described in the Test Methods section according to DIN EN 1465 on aluminum substrate at least partially covered with oil.

According to a beneficial aspect, the thermosettable precursor of the present disclosure is shaped in the form of a film, in particular an elongated film. The term "film" used throughout the present description is meant to designate two-dimensional articles which are usually referred to as strips, foils, bands, sheets, sheeting or the like.

According to this particularly beneficial aspect, the thermosettable precursor of an expanded structural adhesive composition has an elongation at break of at least 50%, at least 80%, at least 100%, at least 150%, or even at least 200%, when measured according to tensile test DIN EN ISO 527. This particular property makes the thermosettable precursor of an expanded structural adhesive composition particularly suitable for automated handling and application, in particular by high-speed robotic equipment. More particularly, the thermosettable precursor of the present disclosure enables efficient automation of the process of forming a metal joint between metal plates.

According to another aspect, the present disclosure relates to a structural adhesive composition obtainable by fully thermosetting the thermosettable precursor as described above.

In yet another aspect, the present disclosure relates to a composite article comprising a thermosettable precursor or a structural adhesive composition as described above applied on at least part of the surface of the article.

Suitable surfaces and articles for use herein are not particularly limited. Any surfaces, articles, substrates and material commonly known to be suitable for use in combination with structural adhesive compositions may be used in the context of the present disclosure.

According to another aspect, the present disclosure is directed to a method of manufacturing a composite article comprising the step of using a thermosettable precursor or a structural adhesive composition as described above.

According to yet another aspect, the present disclosure provides a method of bonding two parts comprising the step of using a thermosettable precursor or a structural adhesive composition as described above.

According to a particular aspect of the disclosure, the method of bonding two parts comprises the steps of:
a) providing a first part and a second part;
b) applying a thermosettable precursor as described above to at least part of the surface of at least one of the first and/or the second part;
c) adhering the first part and the second part at a temperature lower than the activation temperature of the epoxy curing agent, thereby forming a joint between the first and the second part; and
d) heating the joint formed in step c) at a temperature higher than the activation temperature of the epoxy curing agent, thereby obtaining a thermoset structural adhesive composition and bonding the two parts.

In one particular aspect of this method, at least one of the first and the second part comprises metal. In another particular aspect of this method, at least one of the first and second part is a panel. In still another particular aspect of this method, at least one of the first and second part comprises a metal panel. In yet another particular aspect of this method, the material of the first part is the same as the material of the second part. In an alternative aspect, the material of the first part is different from the material of the second part.

According to an advantageous aspect of this method, the material of the first and/or second part is selected from the group consisting of metal, carbon, polymeric material, composite materials, wood, glass, and any combinations or mixtures thereof.

According to one particular aspect of this method, the material of at least one of the first and second part does not comprise metal.

According to another particular aspect of this method, the metal is selected from the group consisting of steel, stainless steel, zinc-plated steel, nickel-plated steel, titanium, aluminum, zinc, magnesium, and their alloys, and combinations thereof.

According to still another particular aspect of this method, the metal of the first metal part is different from the metal of the second metal part. Alternatively, the metal of the first metal part is the same as the metal of the second metal part.

In one advantageous aspect of the method of bonding two parts, the metal of the first metal part is selected from the group consisting of steel, stainless steel, zinc-plated steel, and nickel-plated steel, and the metal of the second metal part is selected from the group consisting of steel, in particular stainless steel, zinc-plated steel, nickel-plated steel.

In another advantageous aspect of the method of bonding two parts, the metal of the first metal part is selected from the group consisting of steel, stainless steel, zinc-plated steel and nickel-plated steel, and the metal of the second metal part is selected from the group consisting of aluminum, titanium, or an alloy comprising one or both of aluminum or titanium.

In a particularly advantageous aspect of the method of bonding two parts, at least part of the at least one surface of said first part and/or second part is covered with oil. In the context of the present disclosure, it has been indeed surprisingly discovered that the thermosettable precursors as described above are particularly suitable to result into structural adhesive compositions having outstanding excellent oil-contamination tolerance towards, in particular, oily contaminated metal substrates.

According to another advantageous aspect, the method of bonding two parts is for hem flange bonding of metal parts, wherein:
the thermosettable precursor is shaped in the form of an elongated film;
the thermosettable precursor film has a first portion near a first end of said precursor film and a second portion near the second end opposite to the first end of said precursor film;
the first metal part comprises a first metal panel having a first body portion and a first flange portion along a margin of said first body portion adjacent a first end of said first body portion;
the second metal part comprises a second metal panel having a second body portion and a second flange portion along a margin of said second body portion adjacent a second end of said second body portion;
wherein the method comprises the steps of:
1. adhering the thermosettable precursor film to the first metal panel or second metal panel, whereby following adhering and folding, a metal joint is obtained wherein the thermosettable precursor film is folded such that:
i. the first portion of the thermosettable precursor film is provided between the second flange of the second metal panel and the first body portion of the first metal panel, and
ii. the second portion of the thermosettable precursor film is provided between the first flange of the first metal panel and the second body portion of the second metal panel; and 2. thermosetting the partially cured precursor by initiating the epoxy curing agent of the epoxy compound, thereby obtaining a (substantially fully) thermoset structural adhesive composition and bonding the metal joint.

According to still another advantageous aspect of the method of bonding two parts, a side of a first edge portion of the first metal part is folded back and a hem flange structure is formed so as to sandwich the second metal part, and the thermosettable precursor is disposed so as to adhere at least the first edge portion of the first metal part and a first surface side of the second metal part to each other.

Methods of bonding two parts, in particular for hem flange bonding of metal parts, are well known to those skilled in the art of structural adhesive compositions. Suitable methods of bonding two parts for use herein are amply described e.g. in EP-A1-2 700 683 (Elgimiabi et al.) and in WO 2017/197087 (Aizawa).

In a particular aspect of the present disclosure, the substrates, parts and surfaces for use in these methods comprise a metal selected from the group consisting of aluminum, steel, iron, and any mixtures, combinations or alloys thereof. More advantageously, the substrates, parts and surfaces for use herein comprise a metal selected from the group consisting of aluminum, steel, stainless steel and any mixtures, combinations or alloys thereof. In a particularly advantageous execution of the present disclosure, the substrates, parts and surfaces for use herein comprise aluminum.

According to another aspect, the present disclosure relates to a metal part assembly obtainable by the method(s) as described above.

According to still another aspect, the present disclosure relates to the use of a thermosettable precursor as described above, for industrial applications, in particular for construction and automotive applications, in particular for body-in-white bonding applications for the automotive industry.

According to yet another aspect, the present disclosure relates to the use of a thermosettable precursor as described above, for bonding metal parts, in particular for hem flange bonding of metal parts in the automotive industry.

According to yet another aspect, the present disclosure provides the use of a mineral pigment selected from the group of phosphate metal complexes as described above, for imparting corrosion resistance to a structural adhesive composition, in particular a thermosettable precursor of an expanded structural adhesive composition.

In yet another aspect, the present disclosure relates to the use of a mineral pigment selected from the group of phosphate metal complexes as described above, for imparting corrosion resistance to a thermosettable precursor of an expanded structural adhesive composition as described above.

Item 1 is a thermosettable precursor of an expanded structural adhesive composition comprising:
a) an epoxy compound;
b) an epoxy curing agent;
c) an expanding agent; and
d) a mineral pigment selected from the group of phosphate metal complexes.

Item 2 is a precursor according to item 1, wherein the expanding agent is selected from the group consisting of (thermally) expandable agents and (thermally) expanded agents, and any combinations or mixtures thereof.

Item 3 is a precursor according to item 2 wherein the (thermally) expandable agent is selected from the group consisting of non-encapsulated blowing agents, in particular chemical blowing agents, encapsulated blowing agents, and any combinations or mixtures thereof.

Item 4 is a precursor according to item 3, wherein the encapsulated blowing agent is selected from the group consisting of expandable microspheres, in particular expandable microspheres filled with liquefied gas and in particular encapsulated in a polymeric thermoplastic shell.

Item 5 is a precursor according to item 4, wherein the liquefied gas is selected from the group consisting of trichlorofluoromethane, and hydrocarbons, in particular n-pentane, iso-pentane, neo-pentane, butane, and iso-butane, and any combinations or mixtures thereof.

Item 6 is a precursor according to item 3, wherein the non-encapsulated blowing agent is selected from the group consisting of azobisisobutyronitriles, azodicarbonamides, carbazides, hydrazides, non-azo chemical blowing agents based on sodium borohydride or sodium bicarbonate/citric acid and dinitrosopentamethylenetetramine, and any combinations or mixtures thereof.

Item 7 is a precursor according to item 2 wherein the (thermally) expanded agent is selected from the group consisting of non-spherical inorganic expanded particles, in particular inorganic expanded particles having an irregular shape or a flake shape.

Item 8 is a precursor according to any of item 2 or 7, wherein the (thermally) expanded agents comprise expanded perlite particles.

Item 9 is a precursor according to any of the preceding items, wherein the expanding agent is selected from the group consisting of expandable microspheres, expanded perlite particles, and any combinations or mixtures thereof.

Item 10 is a precursor according to any of the preceding items, wherein the phosphate metal complex is selected from the group consisting of orthophosphate metal complexes, polyphosphate metal complexes, and any combinations or mixtures thereof.

Item 11 is a precursor according to item 10, wherein the metal of the phosphate metal complex is selected from the group consisting of aluminum, molybdenum, zinc, alkaline-earth metals, in particular calcium, magnesium, strontium and barium, and any combinations or mixtures.

Item 12 is a precursor according to any of item 10 or 11, wherein the phosphate metal complex is selected from the group consisting of (tertiary) metal aluminum orthophosphates, (tertiary) metal aluminum polyphosphates, (tertiary) metal magnesium orthophosphates, (tertiary) metal magnesium polyphosphates, and any combinations or mixtures thereof.

Item 13 is a precursor according to any of items 10 to 12, wherein the phosphate metal complex is selected from the group consisting of (tertiary) alkaline-earth aluminum orthophosphates, (tertiary) alkaline-earth aluminum polyphosphates, (tertiary) alkaline-earth hydrogen orthophosphates, (tertiary) alkaline-earth hydrogen polyphosphates, and any combinations or mixtures thereof.

Item 14 is a precursor according to any of the preceding items, wherein the phosphate metal complex is selected from the group consisting of zinc orthophosphate, zinc aluminum orthophosphate, zinc aluminum polyphosphate, zinc molybdenum orthophosphate, calcium magnesium orthophosphate, strontium aluminum polyphosphate, and any combinations or mixtures thereof.

Item 15 is a precursor according to any of the preceding items, wherein the phosphate metal complex is (substantially) zinc-free.

Item 16 is a precursor according to any of the preceding items, wherein the phosphate metal complex is selected from the group consisting of calcium magnesium orthophosphate, strontium aluminum polyphosphate, and any combinations or mixtures thereof.

Item 17 is a precursor according to any of the preceding items, which comprises no greater than 50 wt. %, no greater than 40 wt. %, no greater than 30 wt. %, no greater than 20 wt. %, no greater than 15 wt. %, no greater than 12 wt. %, or even no greater than 10 wt. % of the mineral pigment selected from the group of phosphate metal complexes, based on the total weight of the thermosettable precursor composition.

Item 18 is a precursor according to any of the preceding items, which comprises at least 0.25 wt. %, at least 0.5 wt. %, at least 1.0 wt. %, at least 1.5 wt. %, at least 2.0 wt. %, at least 2.5 wt. %, or even at least 3.0 wt. % of the mineral pigment selected from the group of phosphate metal complexes, based on the total weight of the thermosettable precursor composition.

Item 19 is a precursor according to any of the preceding items, which comprises from 0.5 to 50 wt. %, from 1 to 40 wt. %, from 2 to 30 wt. %, from 2 to 25 wt. %, from 3 to 20 wt. %, from 3 to 15 wt. % or even from 5 to 10 wt. % of the mineral pigment selected from the group of phosphate metal complexes, based on the total weight of the thermosettable precursor composition.

Item 20 is a precursor according to any of the preceding items, which further comprises a mineral filler capable of absorbing water, which is in particular capable of chemically reacting with water.

Item 21 is a precursor according to item 20, wherein the mineral filler is selected from the group consisting of metal oxides and metal hydroxides, in particular from the group consisting of MgO, CaO, BaO, $K_2O$, $Li_2O$, $Na_2O$, SrO, and any mixtures thereof.

Item 22 is a precursor according to any of item 20 or 21, wherein the mineral filler is selected from the group consisting of CaO, MgO, and any mixtures thereof.

Item 23 is a precursor according to any of items 20 to 22, wherein the mineral filler is selected to comprise CaO.

Item 24 is a precursor according to any of the preceding items, which further comprises a secondary filler material which is different from the mineral filler capable of absorbing water.

Item 25 is a precursor according to item 24, wherein the secondary filler material is selected from the group consisting of silicon oxide $SiO_2$, metal silicates, carbonates, silicates, hydrated silicates (talc), borates, oxides, hydroxides, sulfates, titanates, zirconates and any combinations or mixtures thereof.

Item 26 is a precursor according to any of item 24 or 25, wherein the secondary filler material is a silicon oxide SiO2 selected from the group consisting of fumed silica, fused silica, silica gel, quartz, and any combinations or mixtures thereof.

Item 27 is a precursor according to any of items 24 to 26, wherein the secondary filler material is a silicon oxide $SiO_2$ selected from the group consisting of fumed silica and fused silica, in particular the secondary filler material is fused silica.

Item 28 is a precursor according to any of items 24 to 26, which further comprises a blend comprising MgO, CaO, BaO, $K_2O$, $Li_2O$, $Na_2O$ and $SiO_2$, in particular a blend comprising MgO, CaO and SiO2, metal silicates, carbonates, silicates, hydrated silicates (talc), borates, oxides, hydroxides, sulfates titanates, zirconates.

Item 29 is a precursor according to any of items 24 to 28, which further comprises a blend comprising CaO and SiO2.

Item 30 is a precursor according to any of the preceding items, wherein the epoxy compound is an epoxy resin selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Item 31 is a precursor according to any of the preceding items, wherein the epoxy compound is an epoxy resin selected from the group consisting of novolac epoxy resins, bisphenol epoxy resins, in particular those derived from the reaction of bisphenol-A with epichlorhydrin (DGEBA resins), and any mixtures thereof.

Item 32 is a precursor according to any of the preceding items, wherein the epoxy compound has an average epoxy equivalent weight of less than 250 g/equivalent, less than 230 g/equivalent, less than 220 g/equivalent, or even less than 200 g/equivalent.

Item 33 is a precursor according to any of the preceding items, wherein the epoxy compound has a weight average molecular weight of less than 700 g/mol, less than 500 g/mol, or even less than 400 g/mol.

Item 34 is a precursor according to any of the preceding items, which further comprises a second epoxy resin, in particular selected from the group consisting of hydrogenated bisphenol epoxy resins, more in particular from the group consisting of those derived from the reaction of hydrogenated bisphenol-A with epichlorhydrin (hydrogenated DGEBA resins), and any mixtures thereof.

Item 35 is a precursor according to any of the preceding items, wherein the epoxy curing agent is selected from the group consisting of primary amines, secondary amines, and any combinations or mixtures thereof.

Item 36 is a precursor according to item 35, wherein the amines are selected from the group consisting of aliphatic amines, cycloaliphatic amines, aromatic amines, aromatic structures having one or more amino moiety, polyamines, polyamine adducts, dicyandiamides, and any combinations or mixtures thereof.

Item 37 is a precursor according to any of the preceding items, wherein the epoxy curing agent is selected from the group consisting of dicyandiamide, polyamines, polyamine adducts, and any combinations or mixtures thereof.

Item 38 is a precursor according to any of the preceding items, wherein the epoxy curing agent is selected to be dicyandiamide.

Item 39 is a precursor according to any of the preceding items, which further comprises a curing accelerator of the epoxy compound, which is in particular selected from the group consisting of polyamines, polyamine adducts, ureas, substituted urea adducts, imidazoles, imidazole salts, imidazolines, aromatic tertiary amines, and any combinations or mixtures thereof.

Item 40 is a curable precursor according to item 39, wherein the curing accelerator of the curable monomer is selected from the group of polyamine adducts, substituted ureas, in particular N-substituted (bis)urea adducts.

Item 41 is a precursor according to any of the preceding items, which further comprises a thermoplastic resin having in particular a glass transition temperature (Tg) in a range from 60° C. to 140° C., from 70° C. to 120° C., from 80° C. to 100° C., or even from 85° C. to 95° C., when measured by Differential Scanning calorimetry (DSC).

Item 42 is a precursor according to item 41, wherein the thermoplastic resin is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

Item 43 is a precursor according to any of item 41 or 42, wherein the thermoplastic resin is selected from the group of polyether thermoplastic resins, and in particular polyhydroxyether thermoplastic resins.

Item 44 is a curable precursor according to item 43, wherein the polyhydroxyether thermoplastic resins are selected from the group consisting of phenoxy resins, polyether diamine resins, polyvinylacetal resins, in particular polyvinyl butyral resins, and any combinations or mixtures thereof.

Item 45 is a curable precursor according to any of items 41 to 44, wherein the thermoplastic resin is selected from the group of phenoxy resins.

Item 46 is a curable precursor according to any one of items 41 to 45, wherein the weight ratio of the epoxy compound and the thermoplastic resin is in a range from 0.5 to 4, from 1 to 3, from 1.5 to 2.5, or even from 1.8 to 2.2.

Item 47 is a precursor according to any of the preceding items, which further comprises a toughening agent, in particular selected from the group consisting of core-shell toughening agents.

Item 48 is a precursor according to any of the preceding items, which comprises:
 a) from 20 to 60 wt. %, from 30 to 60 wt. %, from 30 to 50 wt. %, or even from 35 to 45 wt. % of the epoxy compound;
 b) from 0.1 to 20 wt. %, from 0.2 to 15 wt. %, from 0.2 to 10 wt. %, from 0.5 to 8 wt. %, from 1 to 6 wt. %, or even from 1 to 4 wt. % of the epoxy curing agent;
 c) from 0.05 to 10 wt. %, from 0.1 to 10 wt. %, from 0.2 to 8 wt. %, from 0.2 to 6 wt. %, from 0.5 to 6 wt. %, or even from 0.5 to 5 wt. % of the expanding agent;
 d) from 0.5 to 50 wt. %, from 1 to 40 wt. %, from 2 to 30 wt. %, from 2 to 25 wt. %, from 3 to 20 wt. %, from 3 to 15 wt. % or even from 5 to 10 wt. % of the mineral pigment selected from the group of phosphate metal complexes;
 e) optionally, from 0.1 to 35 wt. %, from 0.5 to 30 wt. %, from 1 to 25 wt. %, from 1 to 20 wt. %, or even from 2 to 15 wt. % of the mineral filler capable of absorbing water;
 f) optionally, from 0.5 to 50 wt. %, from 1 to 45 wt. %, from 2 to 40 wt. %, from 3 to 30 wt. %, or even from 5 to 25 wt. % of the secondary filler material;
 g) optionally, from 1 to 50 wt. %, from 2 to 40 wt. %, from 3 to 35 wt. %, from 4 to 30 wt. %, from 4 to 25 wt. %, or even from 5 to 20 wt. % of the thermoplastic resin;
 h) optionally, from 0.05 to 10 wt. %, from 0.1 to 10 wt. %, from 0.2 to 8 wt. %, from 0.2 to 6 wt. %, from 0.2 to 5 wt. %, from 0.5 to 5 wt. %, or even from 0.5 to 4 wt. % of the curing accelerator of the epoxy compound; and
 i) optionally, from 5 to 60 wt. %, from 5 to 55 wt. %, from 10 to 50 wt. %, from 10 to 40 wt. %, or even from 15 to 40 wt. % of the toughening agent;
based on the total weight of the thermosettable precursor composition.

Item 49 is a precursor according to any of the preceding items, which is (substantially) free of solvents, in particular (substantially) free of polar solvents, more in particular (substantially) free of organic solvents or water.

Item 50 is a precursor according to any of the preceding items, wherein the amount of the expanding agent is selected such as to provide the expanded structural adhesive with a free expansion rate upon curing in a range from 30 to 150%, from 40 to 120%, from 50 to 100%, from 60 to 100%, or even from 70 to 100%, when the free expansion rate is measured as described in the Test Methods section according to AECMA Standard EN 2667-3.

Item 51 is a precursor according to any of the preceding items, which provides an overlap shear strength of at least 10 MPa, at least 12 MPa, at least 14 MPa, or even at least 16 MPa, when measured at 23° C. as described in the Test Methods section according to DIN EN 1465 on aluminum substrate at least partially covered with oil.

Item 52 is a precursor according to any of the preceding items, which provides a drop of overlap shear strength of no greater than 30% or less, no greater than 25%, no greater than 20%, no greater than 15%, no greater than 10%, or even no greater than 5%, when measured at 23° C. after cataplasma conditions as described in the Test Methods section according to DIN EN 1465 on aluminum substrate at least partially covered with oil.

Item 53 is a precursor according to any of the preceding items, which is shaped in the form of a film, in particular an elongated film.

Item 54 is a precursor according to item 53, which has an elongation at break of at least 50%, at least 80%, at least 100%, at least 150%, or even at least 200%, when measured according to tensile test DIN EN ISO 527.

Item 55 is a (thermoset) structural adhesive composition obtainable by (substantially) fully thermosetting the thermosettable precursor according to any of the preceding items.

Item 56 is a composite article comprising a thermosettable precursor according to any of items 1 to 54 or a structural adhesive composition according to item 55 applied on at least part of the surface of the article.

Item 57 is a method of manufacturing a composite article comprising the step of using a thermosettable precursor according to any of items 1 to 54 or a structural adhesive composition according to item 55.

Item 58 is a method of bonding two parts comprising the step of using a thermosettable precursor according to any of items 1 to 54 or a structural adhesive composition according to item 55.

Item 59 is a method of bonding two parts according to item 58, which comprises the steps of:
 a) providing a first part and a second part;
 b) applying a thermosettable precursor according to any of items 1 to 54 to at least part of the surface of at least one of the first and/or the second part;
 c) adhering the first part and the second part at a temperature lower than the activation temperature of the epoxy curing agent, thereby forming a joint between the first and the second part; and
 d) heating the joint formed in step c) at a temperature higher than the activation temperature of the epoxy curing agent, thereby obtaining a (substantially fully) thermoset structural adhesive composition and bonding the two parts.

Item 60 is a method according to item 59, wherein at least one of the first and the second part comprises metal.

Item 61 is a method according to any of items 59 or 60, wherein at least one of the first and second part is a panel.

Item 62 is a method according to any one of items 59 to 61, wherein at least one of the first and second part comprises a metal panel.

Item 63 is a method according to any of items 59 to 62, wherein the material of the first part is the same as the material of the second part.

Item 64 is a method according to any of items 59 to 62, wherein the material of the first part is different from the material of the second part.

Item 65 is a method according to any one of items 59 to 64, wherein the material of the first and/or second part is selected from the group consisting of metal, carbon, polymeric material, composite materials, wood, glass, and any combinations or mixtures thereof.

Item 66 is a method according to any one of items 59 to 65, wherein the material of at least one of the first and second part does not comprise metal.

Item 67 is a method according to any of items 59 to 66, wherein the metal is selected from the group consisting of steel, stainless steel, zinc-plated steel, nickel-plated steel, titanium, aluminum, zinc, magnesium, and their alloys, and combinations thereof.

Item 68 is a method according to any of items 59 to 67, wherein the metal of the first metal part is different from the metal of the second metal part.

Item 69 is a method according to any of items 59 to 67, wherein the metal of the first metal part is the same as the metal of the second metal part.

Item 70 is a method according to any of items 59 to 69, wherein the metal of the first metal part is selected from the group consisting of steel, stainless steel, zinc-plated steel, and nickel-plated steel, and the metal of the second metal part is selected from the group consisting of steel, in particular stainless steel, zinc-plated steel, nickel-plated steel.

Item 71 is a method according to any of items 59 to 69, wherein the metal of the first metal part is selected from the group consisting of steel, stainless steel, zinc-plated steel and nickel-plated steel, and the metal of the second metal part is selected from the group consisting of aluminum, titanium, or an alloy comprising one or both of aluminum or titanium.

Item 72 is a method according to any one of items 59 to 71, wherein at least part of the at least one surface of said first part and/or second part is covered with oil.

Item 73 is a method of bonding two parts according to any of items 59 to 72, wherein the two parts are metal parts, and wherein the method is for hem flange bonding of metal parts.

Item 74 is a method according to item 73, wherein:
the thermosettable precursor is shaped in the form of an elongated film;
the thermosettable precursor film has a first portion near a first end of said precursor film and a second portion near the second end opposite to the first end of said precursor film;
the first metal part comprises a first metal panel having a first body portion and a first flange portion along a margin of said first body portion adjacent a first end of said first body portion;
the second metal part comprises a second metal panel having a second body portion and a second flange portion along a margin of said second body portion adjacent a second end of said second body portion;
wherein the method comprises the steps of:
1. adhering the thermosettable precursor film to the first metal panel or second metal panel, whereby following adhering and folding, a metal joint is obtained wherein the thermosettable precursor film is folded such that:
    iii. the first portion of the thermosettable precursor film is provided between the second flange of the second metal panel and the first body portion of the first metal panel, and
    iv. the second portion of the thermosettable precursor film is provided between the first flange of the first metal panel and the second body portion of the second metal panel; and
2. (substantially fully) thermosetting the partially cured precursor by initiating the epoxy curing agent of the epoxy compound, thereby obtaining a (substantially fully) thermoset structural adhesive composition and bonding the metal joint.

Item 75 is a method according to item 74, wherein a side of a first edge portion of the first metal part is folded back and a hem flange structure is formed so as to sandwich the second metal part, and the thermosettable precursor is disposed so as to adhere at least the first edge portion of the first metal part and a first surface side of the second metal part to each other.

Item 76 is a metal part assembly obtainable by the method according to any of items 59 to 75.

Item 77 is the use of a thermosettable precursor according to any of items 1 to 54, for industrial applications, in particular for construction and automotive applications, in particular for body-in-white bonding applications for the automotive industry.

Item 78 is the use according to item 77 for bonding metal parts, in particular for hem flange bonding of metal parts in the automotive industry.

Item 79 is the use of a mineral pigment selected from the group of phosphate metal complexes according to any of items 1 to 16, for imparting corrosion resistance to a structural adhesive composition, in particular a thermosettable precursor of an expanded structural adhesive composition.

Item 80 is the use according to item 79, wherein thermosettable precursor of an expanded structural adhesive composition is according to any of items 1 to 54.

EXAMPLES

The present disclosure is further illustrated by the following examples. These examples are merely for illustrative purposes only and are not meant to be limiting on the scope of the appended claims.

Test Methods Applied:
Preparation of the Substrates at Least Partially Covered with Oil Prior to use, the aluminum substrates (AC 170PXTiZr panels, available from Novelis Sierre) are cleaned by solvent wiping with acetone. Oil Dry lube (Hot Melt Dry lube Multi Draw, available from Zeller & Gmelin, Germany) is then deposited on some of the substrate surfaces by dispensing an appropriate amount of the oil to achieve a given coating weight and then manually smearing the oil to cover the entire panel surface. The Al substrates are then allowed to sit overnight to let the oil flow and level into a layer of uniform thickness.

Overlap Shear Strength

Overlap shear strength is determined according to DIN EN 1465 (issued 2009) using a Zwick Z050 tensile tester (commercially available by Zwick GmbH & Co. KG, Ulm, Germany) operating at a cross head speed of 10 mm/min on substrates having the dimensions 100 mm×25 mm×0.8 mm and coated with 3 g/m² of dry lube (Hot Melt Dry lube Multi Draw, available from Zeller & Gmelin, Germany). For the preparation of an Overlap Shear Strength test assembly the epoxy film to be tested (having a thickness of 0.4 mm) is applied on one end of a first steel strip and covered by a second steel strip forming an overlap joint of 10 mm. The overlap joints are then clamped together using two binder clips and the test assemblies placed into an air circulating oven with a minimum baking cycle of 25 min at 175° C. After curing, the test specimens are conditioned for 24 hours at ambient condition 23+/−2° C. and 50+/−2% relative humidity before testing. The overlap shear strength was determined at 23° C. from at least 3 different specimens and the results were averaged and reported in MPa.

Expansion Ratio

Samples are measured for expansion range according to AECMA Standard EN 2667-3. Results are reported as a percentage change over the original thickness.

Cataplasma Test

Test specimen as described for the overlap shear tests are prepared and wrapped in water-soaked cotton wool and then sealed air-tight in a polyethylene bag. These samples are then stored for seven days at 70° C. and 100% relative humidity. After being unwrapped, the test specimens are stored for two hours at 23° C., followed by 2 hours at −28° C. After subsequent reconditioning under standard climate, the overlap shear testing is carried out as described above. The tests results are then compared to the initial prepared samples, which had not been subjected to the cataplasma conditions as described herein.

Raw Materials Used:

The raw materials used are summarized in Table 1 below.

TABLE 1

Raw material list.

| Tradename | Description/Function | Supplier |
|---|---|---|
| EPIKOTE 828 | Epoxy resin based on diglycidylether of bisphenol-A/epoxy resin | Dow Chemical |
| EPONEX 1510 | Hydrogenated epoxy resin/epoxy resin | Resolution |
| PHK-200 | Thermoplastic resin/toughening Phenoxy resin | In Chem |
| PARALOID 2650J | Core Shell based on Butadiene rubber/toughening | Dow Chem |
| AMICURE CG1200 | Dicyandiamide/curing agent | Air Products |
| Amicure. UR2T | [1,1'-(4 methy-mphenylene) bis(3,3 dimethyl urea)] | Air Products |
| OMICURE U52M | 4,4' Methylene bis (Phenyl Dimethyl Urea)/Cure accelerator | CVC Chem |
| HEUCOPHOS CMP | calcium magnesium orthophosphate/anticorrosive | Heubach GmbH Germany |
| HEUCOPHOS SAPP | strontium aluminum polyphosphate hydrate/anticorrosive | Heubach GmbH Germany |
| MINSIL SF 20 | Fused silica/filler | 3M |
| WKF40 | Calcium Oxide/filler | Weissfeinkalk Omya |

TABLE 1-continued

Raw material list.

| Tradename | Description/Function | Supplier |
|---|---|---|
| SHIELDEX AC-5 | Calcium ion-exchanged amorphous silica/anti corrosion pigment | Grace |
| BUSAN 11-M1 | barium metaborate monohydrate (BaB2O4•H2O)/anti corrosion pigment | Buckman |
| MICROPEARL F48D | Expanding agent | Matsumoto |
| EUROCELL A140 | Expanded Vulcanic rock (perlite) | Strauss Perlite GmbH Austria |

Examples Preparation (Ex-1 to Ex-3 and Comparative Examples CE-1 to CE-3)

The thermosettable precursors of Examples Ex-1 to Ex-3 and comparative examples CE-1 to CE-3 are prepared by combining the ingredients listed in Table 2 in a high-speed mixer (DAC 150 FVZ Speedmixer, from Hauschild Engineering) stirring at 3500 rpm.

In a first step, the epoxy resins and the core shell toughening agent are mixed together for 1 min. The mixture is placed in an air-driven oven at a temperature between 90° C. and 100° C. for 60 min. The mixture is then mixed for 1 min at 3500 rpm after which, the phenoxy resin is added. To ensure complete dispersion of the phenoxy resin, the mixture is placed in the oven at temperature of 130° C. and mixed in several times until a homogenous transparent mixture is obtained. The mixture is allowed to cool down to between 60° C. and 75° C., then the phosphate metal complex and other fillers are added and mixed at 3500 rpm for 2 minutes.

The whole mixture is cooled down to 70° C. and then the curing agents and the expanding agent are added. Mixing is done for 30 min at 2500 rpm. The whole mixture is degassed for 1 min under mixing at 2000 rpm. Using a knife coater, the degassed composition is then coated on polyester nonwoven between 2 siliconized polyester liners. The knife-coater is adjusted to get an adhesive film layers with a thickness of about 0.4 mm. The samples are cured at 175° C. for 25 min and tested on expansion rate, overlap shear strength, initial and after cataplasma test as specified in the test methods described above. The test results can be found in Tables 3 and 4.

TABLE 2

Composition of examples Ex-1 to Ex-3 and comparative examples CE-1 to CE-3 (weight %).

| Ingredients | Ex-1 | Ex-2 | Ex-3 | CE-1 | CE-2 | CE-3 |
|---|---|---|---|---|---|---|
| EPIKOTE 828 | 35.5 | 35.5 | 35.5 | 35.5 | 35.5 | 46 |
| PARALOID 2650 | 20.5 | 20.5 | 20.5 | 20.5 | 20.5 | 26.4 |
| EPONEX 1510 | 6 | 6 | 6 | 6 | 6 | 7.7 |
| PHK-200 | 12.6 | 12.6 | 12.6 | 12.6 | 12.6 | 16.2 |
| WKF40 | 5 | 5 | 5 | 5 | 0 | 0 |
| HEUCOPHOS CMP | 7.7 | 0 | 3.8 | 0 | 0 | 0 |
| MINSIL FS20 | 9 | 9 | 9 | 16.7 | 21.7 | 0 |
| HEUCOPHOS SAPP | 0 | 7.7 | 0 | 0 | 0 | 0 |
| AMICURE CG 1200 | 1.8 | 1.8 | 2.8 | 1.8 | 1.8 | 1.8 |
| OMICURE U52M | 0.9 | 0.9 | 0 | 0.9 | 0.9 | 0.9 |
| OMICURE UR2T | 0 | 0 | 1.2 | 0 | 0 | 0 |
| MICROPEARL F48D | 1 | 1 | 0 | 1 | 1 | 1 |
| EUROCELL A140 | 0 | 0 | 3.6 | 0 | 0 | 0 |
| Total | 100 | 100 | 100 | 100 | 100 | 100 |

TABLE 3

Expansion rate

| | Ex-1 | Ex-2 | Ex-3 | CE-1 | CE-2 | CE-3 |
|---|---|---|---|---|---|---|
| Expansion rate in % | 80 | 85 | 65 | 85 | 75 | 95 |

TABLE 4

Overlap shear strength before and after cataplasma test

| Overlap shear strength Aluminum substrates oiled with dry lube | Ex-1 | Ex-2 | Ex-3 | CE-1 | CE-2 | CE-3 |
|---|---|---|---|---|---|---|
| Average Initial Strength [MPa] | 16.7 | 15.1 | 18.0 | 16.8 | 15.9 | 16.1 |
| Average Strength after Cataplasma [MPa] | 16.2 | 14.6 | 16.8 | 10 | 10.9 | 9.7 |
| Strength Reduction [%] | 3 | 3.3 | 6.6 | 40.5 | 31.5 | 39.8 |

The results in Tables 4 demonstrate that expanded structural adhesives according to the present disclosure (Ex-1 to Ex-3) have excellent corrosion resistance under the cataplasma test. The reduction in overlap shear strength after cataplasma test is considerably lower when compared to expanded structural adhesives not according to the disclosure (CE-1 to CE-3).

Examples Preparation (Ex-4 and Comparative Examples CE-4 to CE-5)

The thermosettable precursors of Example Ex-4 and comparative examples CE-4 to CE-5 are prepared in the same way as described above for examples Ex-1 to Ex-3. The ingredients are listed in Table 5. The samples are cured at 175° C. for 25 min and tested on expansion rate, overlap shear strength, initial and after cataplasma test as specified in the test methods described above. The test results can be found in Tables 6 and 7.

TABLE 5

Composition of example Ex-4 and comparative examples CE-4 to CE-5 (weight %).

| Ingredients | Ex-4 | CE-4 | CE-5 |
|---|---|---|---|
| EPIKOTE 828 | 35.5 | 35.5 | 33.8 |
| PARALOID 2650 | 20.5 | 20.5 | 19.5 |
| EPONEX 1510 | 6.0 | 6.0 | 5.5 |
| PKH-200 | 12.6 | 12.6 | 12.0 |
| WKF40 | 0 | 5.0 | 4.8 |
| HEUCOPHOS CMP | 7 | 0 | 0 |
| SHIELDEX AC-5 | 0 | 6.7 | 0 |
| BUSAN 011 | 0 | 0 | 6.7 |
| MINSIL FS20 | 14.7 | 10.0 | 14.0 |
| AMICURE CG 1200 | 1.8 | 1.8 | 1.7 |
| OMICURE U52M | 0.9 | 0.9 | 0.9 |
| MICROPEARL F48D | 1.0 | 1.0 | 1.0 |
| Total | 100 | 100 | 100 |

TABLE 6

Expansion rate

| | Ex-4 | CE-4 | CE-5 |
|---|---|---|---|
| Expansion rate in % | 80 | 85 | 80 |

TABLE 7

Overlap shear strength before and after cataplasma test

| Overlap shear strength Aluminum substrates oiled with dry lube | Ex-4 | CE-4 | CE-5 |
|---|---|---|---|
| Average Initial Strength [MPa] | 17.5 | 16.7 | 16.8 |
| Average Strength after Cataplasma [MPa] | 14.3 | 11.2 | 10.5 |
| Strength Reduction [%] | 18.2 | 32.9 | 37.5 |

The results in Table 7 demonstrate that expanded structural adhesives according to the present disclosure (Ex-4) have improved corrosion resistance under the cataplasma test when compared to expanded structural adhesives not according to the disclosure (CE-4 and CE-5).

The invention claimed is:

1. A thermosettable precursor of an expanded structural adhesive composition comprising:
    a) an epoxy compound;
    b) an epoxy curing agent;
    c) an expanding agent;
    d) a mineral pigment selected from the group of metal magnesium orthophosphates, metal magnesium polyphosphates, and combinations thereof, and
    e) a thermoplastic resin,
    wherein the thermosettable precursor is in the shape of a single-layer film, optionally comprising a liner.

2. A precursor according to claim 1, wherein the expanding agent is selected from the group consisting of expandable agents and expanded agents, and any combinations or mixtures thereof.

3. A precursor according to claim 2 wherein the expandable agent is selected from the group consisting of chemical blowing agents, encapsulated blowing agents, and any combinations or mixtures thereof.

4. A precursor according to claim 2 wherein the expanded agent is selected from the group consisting of inorganic expanded particles having an irregular shape or a flake shape.

5. A precursor according to claim 1, wherein the expanding agent is selected from the group consisting of expandable microspheres, expanded perlite particles, and any combinations or mixtures thereof.

6. A precursor according to claim 1, wherein mineral pigment is a calcium magnesium orthophosphate.

7. A precursor according to claim 1, which further comprises a mineral filler capable of chemically reacting with water.

8. A precursor according to claim 7, which further comprises a secondary filler material which is different from the mineral filler capable of absorbing water.

9. A precursor according to claim 1, wherein the thermoplastic resin has a glass transition temperature (Tg) in a range from 60°° C. to 140°° C., when measured by Differential Scanning Calorimetry (DSC).

10. A precursor according to claim 1, which further comprises a curing accelerator of the epoxy compound selected from the group consisting of polyamines, polyamine adducts, ureas, substituted urea adducts, imidazoles, imidazole salts, imidazolines, aromatic tertiary amines, and any combinations or mixtures thereof.

11. A precursor according to claim 1, which comprises:
    a) from 20 to 60 wt. % of the epoxy compound;
    b) from 0.1 to 20 wt. %, of the epoxy curing agent;
    c) from 0.05 to 10 wt. % of the expanding agent;

d) from 0.5 to 50 wt. % of the mineral pigment;
e) optionally, from 0.1 to 35 wt. % of a mineral filler capable of absorbing water;
f) optionally, from 0.5 to 50 wt. % of a secondary filler material;
g) from 1 to 50 wt. % of the thermoplastic resin;
h) optionally, from 0.05 to 10 wt. % of a curing accelerator of the epoxy compound; and
i) optionally, from 5 to 60 wt. % of a toughening agent;

based on the total weight of the thermosettable precursor.

12. A method of bonding two parts, which comprises the steps of:
a) providing a first part and a second part;
b) applying a thermosettable precursor according to claim 1 to at least part of the surface of at least one of the first and/or the second part;
c) adhering the first part and the second part at a temperature lower than the activation temperature of the epoxy curing agent, thereby forming a joint between the first and the second part; and
d) heating the joint formed in step c) at a temperature higher than the activation temperature of the epoxy curing agent, thereby obtaining a thermoset structural adhesive composition and bonding the two parts.

13. A method of bonding two parts according to claim 12, wherein the two parts are metal parts, and wherein the method is for hem flange bonding of metal parts.

14. A method of using a thermosettable precursor according to claim 1, for body-in-white bonding applications for the automotive industry.

15. A precursor according to claim 4, wherein the expanding agent is selected from the group consisting of expandable microspheres, expanded perlite particles, and any combinations or mixtures thereof.

16. A precursor according to claim 15, wherein the mineral pigment is a calcium magnesium orthophosphate.

17. A precursor according to claim 15, which further comprises a mineral filler capable of chemically reacting with water, and a secondary filler material which is different from the mineral filler capable of absorbing water.

18. A precursor according to claim 17, which further comprises a curing accelerator of the epoxy compound selected from the group consisting of polyamines, polyamine adducts, ureas, substituted urea adducts, imidazoles, imidazole salts, imidazolines, aromatic tertiary amines, and any combinations or mixtures thereof.

* * * * *